United States Patent [19]
Furukawa et al.

[11] Patent Number: 5,627,240
[45] Date of Patent: May 6, 1997

[54] LOW-TEMPERATURE CURABLE COMPOSITION

[75] Inventors: Masamichi Furukawa, Neyagawa; Satoshi Urano, Tsuzuki-gun; Noriyuki Tsuboniwa, Higashiosaka, all of Japan

[73] Assignee: Nippon Paint Co., Ltd., Osaka-fu, Japan

[21] Appl. No.: 579,257

[22] Filed: Dec. 27, 1995

[30] Foreign Application Priority Data

Dec. 28, 1994 [JP] Japan .................................. 6-326841

[51] Int. Cl.$^6$ .................................................. C08F 8/00
[52] U.S. Cl. ................ 525/384; 525/218; 525/329.5; 525/386
[58] Field of Search ............................ 525/452, 453, 525/460, 450, 329.5, 384, 386, 218

[56] References Cited

U.S. PATENT DOCUMENTS

| | | | |
|---|---|---|---|
| 4,317,894 | 3/1982 | Lewarchik | 525/452 |
| 5,354,495 | 10/1994 | Urano et al. | 526/302 |
| 5,414,055 | 5/1995 | Sugimura et al. | 525/453 |
| 5,434,296 | 7/1995 | Tsuboniwa et al. | 560/157 |

*Primary Examiner*—Tae Yoon
*Attorney, Agent, or Firm*—Wenderoth, Lind & Ponack

[57] ABSTRACT

Disclosed is a low-temperature curable composition comprising:

(a) an acrylic polymer having a molecular weight of 2,000 to 10,000, which has an acyl carbamate group, and
(b) a lactone-modified polyol having a molecular weight of 200 to 20,000 in such an amount that a molar ratio of the acyl carbamate group to a hydroxyl group becomes 0.5 to 2.0.

The low-temperature curable composition is useful for a binder of a paint for use in plastics.

9 Claims, No Drawings

LOW-TEMPERATURE CURABLE COMPOSITION

FIELD OF THE INVENTION

The present invention relates to a curable composition. More particularly, it relates to a low-temperature curable composition which is suitable for a binder of a paint for plastics.

BACKGROUND OF THE INVENTION

A large quantity of plastics has recently been used, and a demand for a paint for use in plastics have been increasing. The paint for plastics is generally required to cure at low-temperature and to provide a coated film superior in hardness, flexibility and acid resistance.

A two-package urethane paint has hitherto widely been used for plastics, because it cures at low-temperature and forms an acid resistant coated film. However, the two-package urethane paint has a problem that a process for coating is complicated and an isocyanate component is toxic. On the other hand, a melamine paint is superior in workability because it is one-package, but it provides a coated film having poor acid resistance.

Japanese Laid-Open Patent Publication No. 63-123471 discloses a paint which forms a coated film having excellent flexibility, but hardness of the coated film is insufficient. Japanese Laid-Open Patent Publication No. 62-140684 discloses a paint which forms a coated film having excellent hardness, but flexibility of the coated film is insufficient.

As described above, there has never been reported a paint which cures at low-temperature and provides a coated film which is superior in hardness, flexibility and acid resistance.

SUMMARY OF THE INVENTION

An object of the present invention is to provide a low-temperature curable composition which is useful for a binder of a paint for plastics.

The present invention provides a low-temperature curable composition comprising:

(a) an acyl carbamate group-containing acrylic polymer having repeating units represented by the formula:

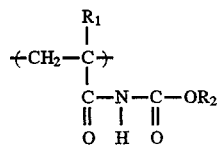

wherein, $R_1$ is a hydrogen atom, or an alkyl group having 1 to 4 carbon atoms such as a methyl group and an ethyl group; $R_2$ is an alkyl group having 1 to 12 carbon atoms such as a methyl group, an ethyl group, a propyl group, a butyl group, an 2-ethylhexyl group and a dodecyl group; an alkoxycarbonylalkyl group having 1 to 12 carbon atoms such as a methoxycarbonylmethyl group and an ethoxycarbonylmethyl group; an alkoxyalkyl group having 1 to 12 carbon atoms such as a methoxyethyl group, an ethoxyethyl group, a butoxyethyl group, a hexyloxyethyl group, a methoxypropyl group, a methoxybutyl group and a 2-ethylhexyloxyethyl group; an acyl alkyl group having 1 to 12 carbon atoms such as an 2-acetyl-1,1-dimethylethyl group (MeCOCH$_2$C(Me)$_2$-); an alkyleneimino group (RR'C=N—) having 1 to 12 carbon atoms such as a methylethylamino group, a methylisobutylimino group, a cyclohexylimino group and a methylphenylimino group; an aryl group having 6 to 25 carbon atoms such as a phenyl group, a 2,6-di-t-butyl-4-methyl phenyl group and naphthyl group; and an aralkyl group having 7 to 12 carbon atoms such as a benzyl group and a phenetyl group; and the formula:

wherein, P, Q, Y and Z is independently a group selected from the group consisting of a hydrogen atom, an alkyl group having 1 to 20 carbon atoms, an alkenyl group having 1 to 20 carbon atoms, an aryl group having not more than 10 carbon atoms, an aralkyl group having not more than 10 carbon atoms, a halogen atom, a cyano group and —COOR$_a$ ($R_a$ is an alkyl group having 1 to 20 carbon atoms, an aryl group having not more than 10 carbon atoms, or an aralkyl group having not more than 10 carbon atoms;

wherein, the acyl carbamate group-containing acrylic polymer is composed of m (m is a positive integer) repeating unit of the formula (I) and n (n is 0 or a positive integer) repeating unit of the formula (II), and has a content of an acyl carbamate group of 0.5 to 6.5 mmol/g and a molecular weight of 2,000 to 10,000; and (b) a lactone-modified polyol having a molecular weight of 200 to 20,000, represented by the formula:

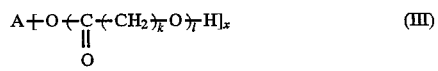

wherein A is a residue of a polyol; k is an integer of 1 to 5; l is an integer of 1 to 3; and x is an integer of not less than 2;

wherein the low-temperature curable composition comprises the acyl carbamate group-containing acrylic polymer (a) and the lactone-modified polyol (b) in an amount that a mol ratio of acyl carbamate group to hydroxyl group becomes 0.5 to 2.0.

A paint prepared from the low-temperature curable composition of the present invention is superior in low-temperature curability, because transesterification of the acyl carbamate bond proceeds at low temperature. Furthermore, the paint has high safety, because it contains no isocyanate. The cured coated film has satisfactory combination of hardness and flexibility, and has acid resistance because it is non-melamine system. Accordingly, there was provided a low-temperature curable composition which is useful for binders of paint for use in plastics, composites of plastic and steel, etc.

DETAILED DESCRIPTION OF THE INVENTION

The acyl carbamate group-containing acrylic polymer, which is used as a main component in the low-temperature curable composition of the present invention can be obtained, for example, by polymerizing an ethylenically unsaturated monomer having an acyl carbamate group (hereinafter it is referred to as "an acyl carbamate group-containing monomer"), represented by the formula:

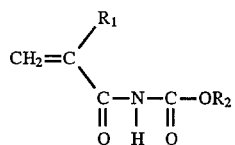

wherein $R_1$ and $R_2$ are the same as defined above; alone, or polymerizing the acyl carbamate group-containing monomer with the ethylenically unsaturated monomer different from the acyl carbamate group-containing monomer.

The acyl carbamate group-containing monomer may be obtained by reacting an ethylenically unsaturated monomer having an acyl isocyanate group, which is represented by the formula:

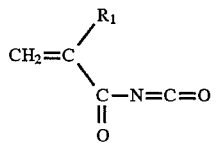

wherein $R_1$ is the same as defined above; with a hydroxyl group-containing compound represented by the formula:

wherein $R_2$ is the same as defined above.

The ethylenically unsaturated monomer having an acyl isocyanate group may be obtained by the method described in Japanese Laid-Open Patent Publication No. 60-115557, and it may also be produced via an intermediate described in Die Nakromoleklare Chemie, 131(1970), 247–257 (No. 3199). Generally, the ethylenically unsaturated monomer having an acyl isocyanate group can be produced by reacting α-alkylacrylamide with oxalyl halide. The reaction is generally conducted at a temperature of 0° to 80° C. in the presence of an inert solvent such as hydrocarbon halide.

The ethylenically unsaturated monomer having an acyyl isocyanate group has a possibility of conducting various reactions. Therefore, when this monomer is reacted with a blocking agent, there has been assumed the proceeding of various side reactions, such as dimerization, trimerization, polymerization of the ethylenically unsaturated monomer having an acyl isocyanate group itself; polymerization of the formed acyl carbamate group-containing ethylenically unsaturated monomer; reaction of an amide-form NH group of the formed acyl carbamate group-containing ethylenically unsaturated monomer with the ethylenically unsaturated monomer having an acyl isocyanate group; etc., in addition to and/or in place of the desired addition reaction between the acyl carbamate group-containing monomer and blocking agent. However, it was confirmed that the above desired reaction proceeds preferentially within a temperature range which does not exceeds 100° C., actually. Particularly, the desired reaction only proceeds quantitatively at relatively low temperature which does not exceed room temperature (0° to 30° C.) and various side reactions to be assumed can be substantially avoided.

The hydroxyl group-containing compound used in the present invention may be a suitable aliphatic, alicyclic or aromatic monoalcohol, phenol, a substituted phenol having a substituent except for halogen, and an oxime. Examples thereof include aliphatic alcohols having 1 to 10 carbon atoms, e.g. various alcohols such as methyl, ethyl, chloroethyl, propyl, butyl (n-butyl and t-butyl), amyl, hexyl (n-hexyl and cyclohexyl), heptyl, octyl, nonyl, 3,3,5-trimethylhexyl, 2-ethylhexyl, decyl, etc.; aromatic alkyl alcohols such as phenyl carbinol, methyl phenyl carbinol, benzyl alcohol, phenethyl alcohol, etc.; ether bond-containing alcohols such as ethylene glycol monoethyl ether, ethylene glycol monobutyl ether, ethylene glycol monohexyl ether, ethylene glycol mono-2-ethylhexyl ether, propylene glycol monomethyl ether, propylene glycol monoethyl ether, butylene glycol monomethyl ether, diethylene glycol monobutyl ether, etc.; phenol itself; substituted-phenols having a substituent except for halogen, in which the substituent does not adversely affect the product, such as cresol, 2,6-di-t-butyl-p-cresol, naphthol, xylenol, nitrophenol, ethyl phenol, t-butyl phenol, etc.; acyl group-containing alcohols such as diacetone alcohol, etc.; ester group-containing alcohols such as methyl glycolate, etc.; oximes such as methyl ethyl ketoxime, methyl isobutyl ketoxime, acetophenone oxime, cyclohexanone oxime, etc.; pyrrolidones; lactams such as ε-caprolactam, etc. Small amount of comparatively nonvolatile higher monoalcohols or phenols may optionally be used as a blocking agent of the present invention. Examples thereof include nonyl phenol, monofunctional polyethylene and polypropylene oxide, e.g. Carbowax 550, etc.

The hydroxyl group-containing compound is generally liquid at room temperature and it can acts as a reaction medium. However, an inert solvent is generally used as a reaction medium whether the hydroxyl group-containing compound is liquid or solid. The inert solvent may be any one that do not adversely affect the reaction, and various solvents can be used. For example, it may be selected appropriately from aliphatic hydrocarbons such as pentane, hexane, heptane, etc.; aromatic hydrocarbons such as benzene, toluene, xylene, etc.; alicyclic hydrocarbons such as cyclohexane, methylcyclohexane, decalin, etc.; hydrocarbon solvents such as petroleum ether, petroleum benzine, etc.; hydrocarbon halide solvents such as carbon tetrachloride, chloroform, 1,2-dichloroethane, etc.; ether solvents such as ethyl ether, isopropyl ether, anisole, dioxane, tetrahydrofuran, etc.; ketones such as acetone, methyl ethyl ketone, methyl isobutyl ketone, cyclohexanone, acetophenone, isophorone, etc.; esters such as ethyl acetate, butyl acetate, etc.; acetonitrile; dimethylformamide; dimethyl sulfoxide; etc. These may be used alone or in combination thereof.

The reaction is generally carried out preferably at −20° to 100° C., advantageously at about room temperature (0° to 30° C.). A side reaction may occur at a high temperature such as 100° C. or more. On the other hand, the reaction ratio disadvantageously becomes small when the temperature is too low. Tin and amine catalysts may be used in the reaction, but it is not necessary to use the catalyst, usually.

The acyl carbamate group-containing monomer may be polymerized alone to obtain a homopolymer, and it may be polymerized with the ethylenically unsaturated monomer having no active hydrogen which is different from the acyl carbamate group-containing monomer to obtain a copolymer. It is not preferred to use a monomer having an active hydrogen because it can reacts with the acyl carbamate group.

The ethylenically unsaturated monomer having no active hydrogen which is different from the acyl carbamate group-containing monomer is represented by the formula:

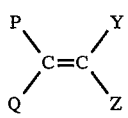

wherein P, Q, Y and Z are the same as defined above.

Examples thereof include the followings:

Monoolefinic and diolefinic hydrocarbons, i.e. monomers having only a hydrogen atom and a carbon atom, such as styrene, α-methyl styrene, α-ethyl styrene, isobutylene (2-methyl-propane-1), 2-methyl-butene-1,2-methyl-pentene-1,2,3-dimethyl-butene-1,2,3-dimethyl-pentene-1,2, 4-dimethyl-pentene-1,2,3,3-trimethyl-heptene-1,2,3-dimethyl-hexene-1,2,4-dimethyl-hexene-1,2,5-dimethyl-hexene-1,2-methyl-3-ethyl-pentene-1,2,3,3-trimethyl-pentene-1,2,3,4-trimethyl-pentene-1,2-methyl-octene-1,2,6-dimethyl-heptene-1,2,6-dimethyl-octene-1,2,3-dimethyl-decene-1,2-methyl-nonadecene-1, ethylene, propylene, butylene, amylene, hexylene, butadiene-1,3, isoprene, etc.;

Halogenated monoolefinic and diolefinic hydrocarbons, i.e. monomers having a carbon atom, a hydrogen atom and at least one halogen atom, such as α-chlorostyrene, α-bromostyrene, 2,5-dichlorostyrene, 2,5-dibromostyrene, 3,4-dichlorostyrene, ortho-, meta- and para-fluorostyrene, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrene, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis- and trans-1,2-dichloroethylene, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2trifluoroethylene, chlorobutadiene and other halogenated diolefinic compounds;

Esters of organic acids and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate and similar vinyl halobenzoates, vinyl p-methoxybenzoate, vinyl p-ethoxybenzoate, methyl crotonate and ethyl tiglate;

Methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, amyl (meth)acrylate, hexyl (meth)acrylate, cyclohexyl (meth)acrylate, 2-ethylhexyl (meth)acrylate, lauryl (meth)acrylate, heptyl (meth)acrylate, octyl (meth)acrylate, 3,5,5-trimethylexyl (meth)acrylate, decyl (meth)acrylate, dodecyl (meth)acrylate and phenyl (meth)acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl α-chloroacetate and isopropenyl α-bromopropionate;

Vinyl α-chloroacetate, vinyl α-bromoacetate, vinyl α-chloropropionate, vinyl α-bromopropionate, vinyl α-iodopropionate, vinyl α-chlorobutyrate, vinyl α-chlorovalerate and vinyl α-bromovalerate;

Allyl chloride, allyl cyanide, allyl bromide, allyl fluoride, allyl iodide, allyl chloride carbonate, allyl nitrate, allyl thiocyanate, allyl formate, allyl acetate, acetate propionate, allyl butyrate, allyl valerate, allyl caploate, allyl 3,5,5-trimethyl hexoate, allyl benzoate, allyl (meth)acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, methallyl esters corresponding to these allyl esters, and esters derived from alkenyl alcohols such as β-ethyl allyl alcohol, β-propyl allyl alcohol, 1-buten-4-ol, 2-methyl-buten-4-ol, 2-(2,2-dimethylpropyl)-1-buten-4-ol and 1-penten-4-ol;

Methyl α-chloro(meth)acrylate, methyl α-bromo(meth)acrylate, methyl α-fluoro(meth)acrylate, methyl α-iodo(meth)acrylate, ethyl α-chloro(meth)acrylate, propyl α-chloro(meth)acrylate, isopropyl α-bromo(meth)acrylate, amyl α-chloro(meth)acrylate, decyl α-chloro(meth)acrylate, methyl α-cyano(meth)acrylate, ethyl α-cyano(meth)acrylate, amyl α-cyano(meth)acrylate and decyl α-cyano(meth)acrylate;

Dimethyl maleate, diethyl maleate, diallyl maleate, dimethyl fumarate, diethyl fumarate and diethyl glutaconate;

Organic nitriles such as acrylonitrile, methacrylonitrile, ethacrylonitrile, crotonitrile and oleonitrile; and Polymerizable amides such as (meth)acrylamide and N,N-dimethylaminopropyl(meth)acrylamide.

The polymerization is carried out by the radical reaction in the presence of the above inert solvent. A conventional radical catalyst is suitably used as a polymerization catalyst. Examples thereof include azobisisobutyronitrile, benzoyl peroxide, cumene hydroperoxide, tetramethylthiuram disulfide, 2,2'-azobis-(4-methoxy-2,4-dimethylvalelonitrile), acetylcyclohexylsulfonyl peroxide, 2,2'-azobis-(2,4-dimethylvaleronitrile), etc. The catalyst is generally formulated in an amount of from 0.1 to 10 parts by weight, based on an amount of the monomer.

The polymerization temperature is generally 20° to 200° C., preferably 80° to 150° C. In case of the polymerization, other additives such as polymerization modifier, etc. may optionally be formulated.

It is preferred that the molecular weight is controlled within a range of 2,000 to 10,000, particularly 2500 to 6000. When the molecular weight exceeds 10,000, viscosity of the resulting polymer becomes too high and workability of the resulting paint becomes poor. On the other hand, when the molecular weight is smaller than 2,000, hardness of the coated film becomes poor. The term "molecular weight" as employed in this specification represents the number molecular weight.

In addition, it is preferred that the resulting acyl carbamate group-containing acrylic polymer has an acyl carbamate group content of 0.5 to 6.5 mmol/g, preferably 0.5 to 3.5 mmol/g. When the amount of the acyl carbamate group is smaller than 0.5 mmol/g, hardness of the resulting coated film becomes poor. On the other hand, when the amount exceeds 6.5 mmol/g, flexibility of the resulting coated film becomes poor.

In contrast with the above process, the acyl carbamate group-containing acrylic polymer of the present invention can also be prepared by polymerizing the ethylenically unsaturated monomer having an acyl isocyanate group to form an acrylic polymer having an acyl isocyanate group by first, followed by blocking the acyl isocyanate group. Conditions, reagents and preferred characteristics to be used for the reaction are the same as described above.

Meanwhile, the acyl carbamate group introduced into an acrylic backbone according to the method of the present invention easily reacts with a compound containing an active hydrogen by heating. Particularly, the acyl carbamate group can be cureed with an compound containing plural active hydrogens at low temperature, in comparison with a conventional blocked isocyanate group. Accordingly, the acyl carbamate group is a stable equivalent of a highly reactive acyl isocyanate group, and it is easily handled.

The lactone-modified polyol used in the low-temperature curable composition of the present invention is represented by the following formula;

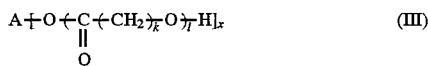 (III)

In the above formula, A is a residue of polyol of which hydroxyl group was reacted with lactone. Accordingly, x is an integer of not less than 2. The k and l are the same as defined above, and k represents the number of lactone ring members, and l represents the addition mole number of polyols per hydroxyl group.

The lactone-modified polyol of the present invention is obtained by ring-opening adding a lactone having 3 to 7 carbon atoms, preferably 4 to 6 carbon atoms, to a polyol in the presence of an acid catalyst.

One embodiment of the lactone-modified polyol of the present invention is a lactone-modified polyol of lower polyhydric alcohol, represented by the above formula wherein A is a residue of a lower polyhydric alcohol having 2 to 15 carbon atoms, preferably 2 to 6 carbon atoms.

Examples of the lower polyhydric alcohol which can be used include difunctional alcohols such as ethylene glycol, diethylene glycol, propanediol, butanediol, hexanediol, etc.; trifunctional alcohols such as trimethylolpropane, glycerin, 1,2,3-heptanetriol, etc.; tetrafunctional alcohols such as pentaerythritol, mesoerythritol, etc.; hexafunctional alcohols such as dipentaerythritol, mannitol, etc. Examples of the lactone which can be used include propiolactone, butyrolactone, valerolactone, caprolactone, hexylolactone, etc. Among them, caprolactone is particularly preferred due to its easiness of industrial production. The acid catalyst may be any one which is generally used for the ring-opening addition reaction, and examples thereof include Lewis acids such as tin catalyst, e.g. dibutyltin dilaurate, etc.

The reaction can be carried out, for example, by conventional modification methods such as a process which comprises simultaneously charging the lower polyhydric alcohol, lactone and acid catalyst and heating the mixture to the reaction temperature with stirring, or a process which comprises adding dropwise the polyhydric alcohol in the lactone and acid catalyst, which are previously heated to the reaction temperature.

It is preferred that the resulting lactone-modified polyol of lower polyhydric alcohol has a number-average molecular weight of 200 to 1500, particularly 300 to 600, and a hydroxyl group amount of 3 to 8 mmol/g, particularly 6 to 8 mmol/g. When the number-average molecular weight is smaller than 200, hardness of the resulting coated film becomes poor. On the other hand, when the number-average molecular weight exceeds 1500, viscosity of the resulting polymer becomes too high and workability of the resulting paint becomes poor. The molecular weight and the hydroxyl group amount can be generally controlled by changing a kind and a mixing ratio of the polyhydric alcohol and lactone.

The lactone-modified polyol of lower polyhydric alcohol which can be used for the present invention is commercially available from Daicel Chemical Industries Co., Ltd under the trade name of "Placcel" series. Examples thereof include difunctional polyols such as "Placcel 205" having a number-average molecular weight of 500, "Placcel 208" having a number-average molecular weight of 800, etc.; trifunctional polyols such as "Placcel 303" having a number-average molecular weight of 300, "Placcel 305" having a number-average molecular weight of 500, "Placcel 306" having a number-average molecular weight of 600, "Placcel 308" having a number-average molecular weight of 800, etc.; tetrafunctional polyols such as "Placcel 404" having a number-average molecular weight of 400, "Placcel 406" having a number-average molecular weight of 600, "Placcel 407" having a number-average molecular weight of 700, etc.; hexafunctional polyols such as "Placcel 604" having a number-average molecular weight of 400, "Placcel 609" having a number-average molecular weight of 900, etc.

Another embodiment of the lactone-modified polyol of the present invention is an acrylic lactone-modified polyol represented by the above formula, wherein, A is a residue of an acrylic polyol.

For example, such an acrylic lactone-modified polyol can be prepared by polymerizing a lactone-modified ethylenically unsaturatedmonomer having a terminal hydroxyl group (hereinafter it is referred to as "a hydroxyl group-containing lactone-modified monomer"), which is represented by the formula:

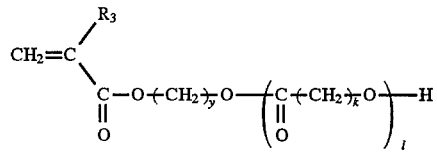

wherein $R_3$ is a hydrogen atom or an alkyl group having 1 to 4 carbon atoms, such as methyl group and an ethyl group; y is an integer of 1 to 10, and k and l are as defined above; alone, or polymerizing the hydroxyl group-containing lactone-modified monomer with the ethylenically unsaturated monomer different from the hydroxyl group-containing lactone-modified monomer.

The hydroxyl group-containing lactone-modified monomer is obtained, for example, by ring-opening adding 1 to 5, preferably 1 to 2 above described lactones to an ethylenically unsaturated monomer having a hydroxyl group, which is represented by the formula:

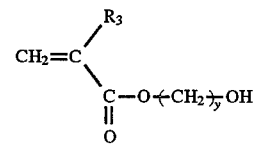

wherein $R_3$ and y are the same as defined above. Examples of the ethylenically unsaturated monomer having a hydroxyl group include 2-hydroxyethyl (meth)acrylate, 4-hydroxybutyl (meth)acrylate, 2-hydroxybutyl (meth) acrylate, hydroxypropyl (meth)acrylate, hydroxypropyl (meth)acrylate, etc.

The hydroxyl group-containing lactone-modified monomer, which can be used in the present invention, is commercially available from Daicel Chemical Industries Co., Ltd. under the trade name of "FM" series obtained by adding lactones to 2-hydroxyethyl methacrylate and "FA" series obtained by adding lactones to 2-hydroxyethyl acrylate. Examples thereof include "FM-1" having 1 added caprolactone in an average, "FM-2" having 2 added caprolactones in an average, "FM-3" having 3 added caprolactones in an average, "FM-4" having 4 added caprolactones in an average, "FM-5" having 5 added caprolactones in an average, FA-1" having 1 added caprolactone in an average, "FA-2" having 2 added caprolactones in an average, "FA-3" having 3 added caprolactones in an average, "FA-4" having 4 added caprolactones in an average, "FA-5" having 5 added caprolactones in an average, etc.

Examples of a comonomer of the hydroxyl group-containing lactone-modified monomer include the ethylenically unsaturated monomer having no active hydrogen which is different from the acyl carbamate group-containing monomer, described for preparing an acyl carbamate group-containing acrylic polymer, the above described ethylenically unsaturated monomer having hydroxyl group, a carboxyl group-containing monomer such as acrylic acid, methacrylic acid, and an amide group-containing monomer such as acrylamide, methacrylamide.

The polymerization can also be carried out in the same manner as that described above, but it is preferred that a number-average molecular weight of the resulting polymer is controlled within a range of 2,000 to 20,000. When the number-average molecular weight is smaller than 2,000, hardness of the resulting coated film becomes poor. On the other hand, when the number-average molecular weight exceeds 20,000, viscosity of the resulting polymer becomes too high and workability of the resulting paint becomes poor. It is preferred that a hydroxyl group amount of the resulting polymer is controlled within a range of 0.5 to 3.5 mmol/g. When the hydroxyl group amount is not within this range, curing properties and physical properties of the resulting paint becomes poor.

The acrylic lactone-modified polyol of the present invention can also be obtained by polymerizing the above described ethylenically unsaturated monomer having a hydroxyl group to prepare an acrylic polymer having a hydroxyl group by first, and then ring-opening adding the above described lactone to the acrylic polymer.

The acrylic polymer having a hydroxyl group can be prepared in the same manner as that described above, except for using an ethylenically unsaturated monomer having a hydroxyl group in place of the hydroxyl group-containing lactone-modified ethylenically unsaturated monomer.

The low-temperature curable composition of the present invention can be obtained by mixing the acyl carbamate group-containing acrylic polymer thus obtained with the lactone-modified polyol. A mixing ratio is preferably selected so that a molar ratio of the acyl carbamate group contained in the acyl carbamate group-containing acrylic polymer to the hydroxyl group contained in the lactone-modified polyol becomes 0.5 to 2.0, particularly 0.5 to 1.5. When the mixing ratio deviates from the above range, an amount of the unreacted functional group increases, therefore, physical property of the coated film, such as hardness, etc. may become poor.

Organic solvents can optionally be contained in the low-temperature curable composition of the present invention so as to control its viscosity to a level which is suitable for coating. Furthermore, additives known to those skilled in the art for coating, such as anti-corrosive pigments (e.g. borate, phosphate, chromate, molybdate, etc.), coloring pigments (e.g. titanium oxide, carbon black, quinacridone, cyanine blue, etc.), surface modifiers, ultraviolet absorbers, antioxidants, pigment sedimentation inhibitors, etc., may be included in the low-temperature curable composition of the present invention to provide a paint of the present invention.

The paint of the present invention can be applied and cured by a process known to those skilled in the art. For example, the coated film of the present invention can be obtained by applying the paint on a substrate using a spray or a bar coater, followed by baking at 100° to 140° C. for 10 to 60 minutes.

EXAMPLES

The following Examples and Comparative Examples further illustrate the present invention in detail but are not to be construed to limit the scope thereof.

Production Example 1

Preparation of "Polymer A" Having Acyl Carbamate Group

A 300 ml four-necked flask was equipped with a thermometer, a stirrer, a nitrogen introducing tube and a 200 ml dropping funnel and methyl isobutyl ketone (MIBK, 100 g) was charged in the flask, which was heated to 100° C. N-methacryloyl hexyloxyethyl carbamate (MAHC, 70 g), methyl methacrylate (MMA, 3 g), 2-ethylhexyl acrylate (EHA, 27 g) and N,N'-azobisisobutyronitrile (AIBN, 5 g) were mixed, and the mixture was charged in the 200 ml dropping funnel and added dropwise at constant speed over 90 minutes. After completion of dropping, the mixture was stirred at 100° C. for 30 minutes and 0.5 g of AIBN dissolved in MIBK was added dropwise over about 10 minutes, followed by stirring at 100° C. for 90 minutes to obtain the "polymer A" having acyl carbamate group, having a nonvolatile content of 48%, a polymer conversion ratio of 93%, a number-average molecular weight of 2500, Tg of −15° C. and an acyl carbamate amount of 2.72 mmol/g.

Production Examples 2 to 8

Preparation of "Polymers B to H" Having an Acyl Carbamate Group

According to the same manner as that described in Production Example 1 except for using the monomer composition shown in the following Table 1, "polymers B to H" having an acyl carbamate group were obtained. The characteristic values of the resulting polymers are also shown in Table 1.

TABLE 1

|  | Production Example No. | | | | | | | |
|---|---|---|---|---|---|---|---|---|
|  | 1 | 2 | 3 | 4 | 5 | 6 | 7 | 8 |
|  | Label of polymer | | | | | | | |
|  | A | B | C | D | E | F | G | H |
| Monomer Composition (g) | | | | | | | | |
| Methyl methacrylate | 3 |  | 5 | 10 | 10 | 10 | 5 | 3 |
| 2-Ethylhexyl acrylate | 27 |  |  |  |  |  |  | 17 |
| 2-Ethylhexyl methacrylate |  | 25 |  |  |  | 20 | 15 |  |
| n-Butyl methacrylate |  |  | 25 | 20 | 20 |  | 50 |  |

TABLE 1-continued

| | Production Example No. | | | | | | | |
|---|---|---|---|---|---|---|---|---|
| | 1 | 2 | 3 | 4 | 5 | 6 | 7 | 8 |
| | Label of polymer | | | | | | | |
| | A | B | C | D | E | F | G | H |
| Styrene | 5 | | | | | | | |
| Ethyl N-methacryloylcarbamate | | 70 | | | | | | 80 |
| Butoxyethyl N-methacryloyl-carbamate | | | | 70 | | | | |
| Hexyloxyethyl N-methacryloyl-carbamate | 70 | | | | | | 30 | |
| 2-Ethylhexyl N-methacryloyl-carbamate | | | 70 | | | | | |
| Methoxycarbonylmethyl N-methacryloylcarbamate | | | | | 70 | | | |
| Isobutoxyimine N-methacryloyl-carbamate | | | | | | 70 | | |
| AIBN (g) | 5.0 | 5.5 | 5.5 | 5.5 | 5.5 | 5.5 | 3.5 | 5.5 |
| Nonvolatile content (%, MIBK) | 48 | 48 | 50 | 49 | 45 | 45 | 48 | 50 |
| Conversion rate (%) | 93 | 97 | 96 | 93 | 92 | 90 | 94 | 95 |
| Number-average molecular weight | 2500 | 2800 | 3000 | 3500 | 2600 | 2600 | 6000 | 3800 |
| Amount of acyl carbamate (mmol/g) | 2.72 | 4.46 | 2.90 | 3.06 | 3.48 | 3.10 | 1.17 | 5.10 |

Production Example 9

Preparation of Lactone-Modified Polyol 1

A 300 ml four-necked flask was equipped with a thermometer, a stirrer, a nitrogen introducing tube and a 200 ml dropping funnel and methyl isobutyl ketone (MIBK, 100 g) was charged in the flask, which was heated to 100° C. FM-1 (44 g, manufactured by Daicel Chemical Industries Co., Ltd.), n-butyl acrylate (nBA, 27 g), methyl methacrylate (MMA, 29 g) and N,N'-azobisisobutyronitrile (AIBN, 2.5 g) were mixed, and the mixture was charged in the 200 ml dropping funnel and added dropwise at constant speed over 90 minutes. After completion of dropping, the mixture was stirred at 100° C. for 30 minutes and 0.25 g of AIBN dissolved in MIBK was added dropwise over about 10 minutes, followed by stirring at 100° C. for 90 minutes to obtain a lactone-modified polyol 1 having a nonvolatile content of 48%, a polymer conversion ratio of 100%, a number-average molecular weight of 8800, Tg of 0° C. and a hydroxyl group amount of 1.78 mmol/g.

Production Examples 10 to 13

Preparation of Lactone-Modified Polyols 2 to 5

According to the same manner as that described in Production Example 9 except for using the monomer composition shown in the following Table 2, lactone-modified polyols 2 to 5 were obtained. The characteristic values of the resulting polymers are also shown in Table 2.

TABLE 2

| | Production Examples | | | | |
|---|---|---|---|---|---|
| | 9 | 10 | 11 | 12 | 13 |
| | Label of polymer | | | | |
| | 1 | 2 | 3 | 4 | 5 |
| Monomer composition (g) | | | | | |
| Methyl methacrylate | 29 | 31 | 27 | 28 | 28 |
| n-Butyl acrylate | 27 | 5 | 55 | 17 | 17 |
| FM-1 | 44 | | 18 | 55 | 55 |
| FM-2 | | 64 | | | |
| AIBN (g) | 2.5 | 2.5 | 2.75 | 2.75 | 1.8 |
| Nonvol. content (%, MIBK) | 48 | 47 | 48 | 47 | 47 |
| Polymer conversion (%) | 100 | 100 | 100 | 100 | 100 |
| Mn | 8800 | 7900 | 9200 | 8500 | 15000 |
| Amount of OH group (mmol/g) | 1.78 | 1.78 | 0.72 | 2.23 | 2.23 |

Production Example 14

Preparation of Acrylic Polyol 6

A 300 ml four-necked flask was equipped with a thermometer, a stirrer, a nitrogen introducing tube and a 200 ml dropping funnel and methyl isobutyl ketone (MIBK, 100 g) was charged in the flask, which was heated to 100° C. 2-Hydroxyethyl methacrylate (23 g), n-butyl acrylate (nBA, 48 g), methyl methacrylate (MMA, 29 g) and N,N'-azobisisobutyronitrile (AIBN, 2.5 g) were mixed, and the mixture was charged in the 200 ml dropping funnel and added dropwise at constant speed over 90 minutes. After completion of dropping, the mixture was stirred at 100° C. for 30 minutes and 0.25 g of AIBN dissolved in MIBK was added dropwise over about 10 minutes, followed by stirring at 100° C. for 90 minutes to obtain an acrylic polyol 6 having a nonvolatile content of 48%, a polymer conversion ratio of 100%, a number-average molecular weight of 8200, Tg of 0° C and a hydroxyl group amount of 1.78 mmol/g.

Production Example 15

Preparation of Acrylic Polyol 7

According to the same manner as that described in Production Example 14 except for using the monomer composition shown in the following Table 3, an acrylic polyol 7 was obtained. The characteristic values of the resulting polymer are also shown in Table 3.

TABLE 3

|  | Production Examples | |
|---|---|---|
|  | 14 | 15 |
|  | Label of polymer | |
|  | 6 | 7 |
| Monomer composition (g) | | |
| 2-Hydroxyethyl methacrylate | 23 | |
| 4-Hydroxybutyl acrylate |  | 26 |
| n-Butyl acrylate | 48 | 30 |
| Methyl methacrylate | 29 | 44 |
| AIBN (g) | 2.5 | 2.5 |
| Nonvol. content (%, MIBK) | 48 | 48 |
| Polymer conversion (%) | 100 | 100 |
| Mn | 8200 | 6800 |
| Amount of OH group (mmol/g) | 1.78 | 1.78 |

Example 1

The "polymer A" having an acyl carbamate group (65 g) obtained in Production Example 1 and lactone-modified polyol 1 (100 g) obtained in Production Example 9 were mixed at room temperature. The resulting mixture was applied on a tin plate using a bar coater (#75), and left at room temperature for 30 minutes. The applied tin plate was then baked at 120° C. for 30 minutes to obtain a cured coated film. A gel fractional ratio of the coated film was 95%. Hardness, flexibility and acid resistance of the resulting coated film were measured by the following methods. A result of the pencil hardness test was HB, the folding test was 0T, the impact resistance test was 30 kgcm, and the acid-resistance test was good.

Test methods of the cured film (1) Hardness

A cured coated film was scratched using a set of hardness-measuring pencils. Maximum hardness of the pencils which do not forms scratch on the surface of the coated film was adopted as the rating of hardness.

(2) Flexibility

Flexibility was tested according to the following two methods.

(a) Impact resistance test

Du Pont type drop-weight test described in JIS-K-5400-6.13 was conducted. A value of potential energy calculated according to (weight of the load x height) was adopted as the rating.

(b) Folding test

The coated plate was folded such that the coated surface faces outward with putting some plates for coating therebetween. The smallest number of the plates inserted between the folded coated plate which makes no failure such as fracture and clack on the coated film was adopted as the rating.

(3) Acid resistance (a) 1N sulfuric acid (1 ml) was placed on a coated film, and left at 40° C. overnight. The coated film was visually observed whether abnormality such as blister, rust, etc. is present or not.

(b) A coated film was dipped in iN sulfuric acid (1 ml), and left at 40° C. for 38 days. The coated film was visually observed whether abnormality such as blister, rust, etc. is present or not.

Examples 2 to 29 and Comparative Examples 1 to 8

According to the same manner as that described in Example 1 except for using the formulation shown in the following Table 4 and optionally using a polypropylene (PP) plate as a substrate to be coated in place of the tin plate, a cured coated film was produced and tested, respectively.

The PP plate was primed with commercially available chlorinated PP, or corona treated before coating. Two kinds of PP plates which are "M4800" containing a rubber component (manufactured by Mitsui Petroleum Chemical Co., Ltd.) and those containing no rubber component (commercially available) were used. The test results are shown in Table 5.

As to the pencil hardness, it should be taken into consideration the fact that the rating of a coated film on the PP plate becomes low as much as 1 level, when compared to the rating of the same coated film on the tin plate.

TABLE 4

| Ex. No. | Acyl carbamate polymer | Amount (g) | Polyol | Amount (g) | Equiv. ratio[a] | Substrate |
|---|---|---|---|---|---|---|
| 1 | A (P Ex. 1) | 65 | 1 (P Ex. 9) | 100 | 1/1 | Tin plate |
| 2 | A (P Ex. 1) | 64 | 2 (P Ex. 10) | 100 | 1/1 | Tin plate |
| 3 | A (P Ex. 1) | 26 | 3 (P Ex. 11) | 100 | 1/1 | Tin plate |
| 4 | A (P Ex. 1) | 80 | 5 (P Ex. 13) | 100 | 1/1 | Tin plate |
| 5 | A (P Ex. 1) | 124 | Placcel 305 | 25 | 1/1 | Tin plate |
| 6 | A (P Ex. 1) | 142 | Placcel 305 | 20 | 1/0.7 | Tin plate |
| 7 | A (P Ex. 1) | 116 | Placcel 305 | 35 | 1/1.5 | Tin plate |
| 8 | G (P Ex. 7) | 173 | Placcel 305 | 15 | 1/1 | Tin plate |
| 9 | H (P Ex. 8) | 113 | Placcel 305 | 45 | 1/1 | Tin plate |
| 10 | G (P Ex. 7) | 34 | 3 (P Ex. 11) | 112 | 1/0.5 | Tin plate |
| 11 | H (P Ex. 8) | 21 | 3 (P Ex. 11) | 110 | 1/0.7 | Tin plate |
| 12 | G (P Ex. 7) | 87 | 4 (P Ex. 12) | 70 | 1/1.5 | Tin plate |
| 13 | H (P Ex. 8) | 68 | 4 (P Ex. 12) | 83 | 1/2.0 | Tin plate |
| 14 | B (P Ex. 2) | 120 | Placcel 305 | 40 | 1/1 | Tin plate |
| 15 | C (P Ex. 3) | 135 | Placcel 305 | 30 | 1/1 | Tin plate |
| 16 | D (P Ex. 4) | 129 | Placcel 305 | 30 | 1/1 | Tin plate |

TABLE 4-continued

| | Acyl carbamate polymer | Amount (g) | Polyol | Amount (g) | Equiv. ratio[a] | Substrate |
|---|---|---|---|---|---|---|
| 17 | E (P Ex. 5) | 123 | Placcel 305 | 30 | 1/1 | Tin plate |
| 18 | F (P Ex. 6) | 140 | Placcel 305 | 30 | 1/1 | Tin plate |
| 19 | A (P Ex. 1) | 129 | Placcel 404 | 5 | 1/1 | Tin plate |
| 20 | A (P Ex. 1) | 130 | Placcel 604 | 5 | 1/1 | Tin plate |
| 21 | A (P Ex. 1) | 124 | Placcel 305 | 25 | 1/1 | Primed PP (M4800) |
| 22 | A (P Ex. 1) | 124 | Placcel 305 | 25 | 1/1 | Primed PP |
| 23 | A (P Ex. 1) | 124 | Placcel 305 | 25 | 1/1 | Corona[b] PP (M4800) |
| 24 | D (P Ex. 4) | 129 | Placcel 305 | 30 | 1/1 | Primed PP (M4800) |
| 25 | E (P Ex. 5) | 123 | Placcel 305 | 30 | 1/1 | Primed PP (M4800) |
| 26 | F (P Ex. 6) | 140 | Placcel 305 | 30 | 1/1 | Primed PP (M4800) |
| 27 | D (P Ex. 4) | 63 | 1 (P Ex. 9) | 110 | 1/1 | Primed PP (M4800) |
| 28 | E (P Ex. 5) | 60 | 1 (P Ex. 9) | 110 | 1/1 | Primed PP (M4800) |
| 29 | F (P Ex. 6) | 68 | 1 (P Ex. 9) | 110 | 1/1 | Primed PP (M4800) |
| C Ex. No. | | | | | | |
| 1 | A (P Ex. 1) | 65 | 6 (P Ex. 14) | 100 | 1/1 | Tin plate |
| 2 | A (P Ex. 1) | 65 | 6 (P Ex. 14) | 100 | 1/1 | Tin plate |
| 3 | A (P Ex. 1) | 153 | TMP[c] | 8 | 1/1 | Tin plate |
| 4 | Commercially available polyester/melamine curable type clear for plastics | | | | 8/2 | Tin plate |
| 5 | A (P Ex. 1) | 65 | 6 (P Ex. 14) | 100 | 1/1 | Primed PP (M4800) |
| 6 | A (P Ex. 1) | 65 | 7 (P Ex. 15) | 100 | 1/1 | Primed PP (M4800) |
| 7 | A (P Ex. 1) | 153 | TMP | 8 | 1/1 | Primed PP (M4800) |
| 8 | Commercially available polyester/melamine curable type clear for plastics | | | | 8/2 | Primed PP (M4800) |

[a]Equivalent ratio of acyl carbamate group to hydroxyl group
[b]Corona treated
[c]Trimethylolpropane

TABLE 5

| Ex. No. | Curing condition | Gel frac. (%) | Pencil hard. | Impact resist. (kgcm) | Folding test | Acid resist. |
|---|---|---|---|---|---|---|
| 1 | 120° C. × 30 min. | 95 | HB | 30 | 0T | Good |
| 2 | 120° C. × 30 min. | 98 | F | 25 | 2T | Good |
| 3 | 120° C. × 30 min. | 92 | HB | 25 | 1T | Good |
| 4 | 120° C. × 30 min. | 97 | F | 22 | 3T | Good |
| 5 | 120° C. × 30 min. | 95 | F | 35 | 3T | Good |
| 6 | 120° C. × 30 min. | 92 | HB | 30 | 1T | Good |
| 7 | 120° C. × 30 min. | 99 | H | 22 | 3T | Good |
| 8 | 120° C. × 30 min. | 93 | HB | 30 | 1T | Good |
| 9 | 120° C. × 30 min. | 98 | F | 20 | 3T | Good |
| 10 | 120° C. × 30 min. | 90 | HB | 20 | 1T | Good |
| 11 | 120° C. × 30 min. | 95 | F | 20 | 3T | Good |
| 12 | 120° C. × 30 min. | 93 | HB | 30 | 1T | Good |
| 13 | 120° C. × 30 min. | 97 | H | 20 | 3T | Good |
| 14 | 150° C. × 30 min. | 98 | H | 25 | 3T | Good |
| 15 | 120° C. × 30 min. | 95 | HB | 30 | 1T | Good |
| 16 | 120° C. × 30 min. | 95 | HB | 30 | 1T | Good |
| 17 | 100° C. × 30 min. | 93 | HB | 30 | 1T | Good |
| 18 | 80° C. × 30 min. | 90 | HB | 30 | 1T | Good |
| 19 | 120° C. × 30 min. | 98 | HB | 30 | 2T | Good |
| 20 | 120° C. × 30 min. | 97 | HB | 28 | 3T | Good |
| 21[P] | 120° C. × 30 min. | 95 | F | 35 | | Good |
| 22[P] | 120° C. × 30 min. | 95 | F | 35 | | Good |
| 23[P] | 120° C. × 30 min. | 95 | F | 35 | | Good |
| 24[P] | 120° C. × 30 min. | 95 | HB | 30 | | Good |
| 25[P] | 100° C. × 30 min. | 93 | HB | 28 | | Good |
| 26[P] | 80° C. × 30 min. | 90 | H | 30 | | Good |
| 27[P] | 120° C. × 30 min. | 95 | HB | 28 | | Good |
| 28[P] | 100° C. × 30 min. | 93 | HB | 28 | | Good |
| 29[P] | 80° C. × 30 min. | 95 | HB | 28 | | Good |
| C[b]1 | 120° C. × 30 min. | 100 | F | <5 | Fract.[a] | Good |
| C2 | 120° C. × 30 min. | 93 | HB | 3 | 1T | Good |
| C3 | 120° C. × 30 min. | 98 | 2H | <1.5 | Fract. | Good |
| C4 | 120° C. × 30 min. | 96 | 3H | 50 | 0T | Poor |
| C5[P] | 120° C. × 30 min. | 99 | F | <5 | | Good |
| C6[P] | 120° C. × 30 min. | 95 | HB | 3 | | Good |
| C7[P] | 120° C. × 30 min. | 95 | 2H | <1.5 | | Good |
| C8[P] | 120° C. × 30 min. | 98 | 3B | 50 | | Poor |

[a]Fractured when folded at 90 degree.
[b]Comparative Example
[P]PP plate was used as the material to be painted.

As is apparent from the above results, paints of Comparative Examples 1 to 3 provide a coated film which is superior in hardness but is inferior in impact resistance, and paint of Comparative Example 4 provides a coated film which is superior in impact resistance but is inferior in hardness.

What is claimed is:

1. A low-temperature curable composition comprising:
   (a) an acyl carbamate group-containing acrylic polymer having repeating units represented by the formula:

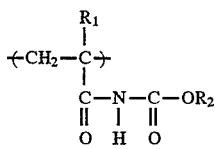

(I)

wherein, $R_1$ is a hydrogen atom, or an alkyl group having 1 to 4 carbon atoms; $R_2$ is an alkyl group having 1 to 12 carbon atoms; an alkoxycarbonylalkyl group having 1 to 12 carbon atoms; an alkoxyalkyl group having 1 to 12 carbon atoms; an acyl alkyl group having 1 to 12 carbon atoms; an alkyleneimino group (RR'C=N—) having 1 to 12 carbon atoms; an aryl group having 6 to 25 carbon atoms; and an aralkyl group having 7 to 12 carbon atoms; and the formula:

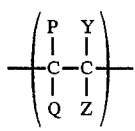  (II)

wherein, P, Q, Y and Z is independently a member selected from the group consisting of hydrogen atom, an alkyl group having 1 to 20 carbon atoms, an alkenyl group having 1 to 20 carbon atoms, an aryl group having not more than 10 carbon atoms, an aralkyl group having not more than 10 carbon atoms, a halogen atom, a cyano group and —COOR$_a$, in which R$_a$ is an alkyl group having 1 to 20 carbon atoms, an aryl group having not more than 10 carbon atoms, or an aralkyl group, having not more than 10 carbon atoms;

wherein, the acyl carbamate group-containing acrylic polymer is composed of m repeating units of the formula (I) in which m is a positive integer and n repeating units of the formula (II) in which n is 0 or a positive integer, and has an acyl carbamate group content of 0.5 to 6.5 mmol/g and a number average molecular weight of 2,000 to 10,000; and (b) a lactone-modified polyol having a number molecular weight of 200 to 20,000, represented by the formula:

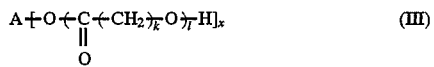  (III)

wherein A is a residue of a polyol; k is an integer of 1 to 5; l is an integer of 1 to 3; and x is an integer of not less than 2; wherein the low-temperature curable composition comprises the acyl carbamate group-containing acrylic polymer (a) and the lactone-modified polyol (b) in an amount that a mol ratio of acyl carbamate groups to hydroxyl groups becomes 0.5 to 2.0.

2. The low-temperature curable composition according to claim 1, wherein the acyl carbamate group-containing acrylic polymer has a an acyl carbamate group content of 0.5 to 3.5 mmol/g.

3. The low-temperature curable composition according to claim 1, wherein the acyl carbamate group-containing acrylic polymer has a number average molecular weight of 2500 to 6000.

4. The low-temperature curable composition according to claim 1, wherein the residue "A" of the lactone-modified polyol (III) represents a residue of a lower polyhydric polyol.

5. The low-temperature curable composition according to claim 4, wherein the lactone-modified polyol has a number average molecular weight of 200 to 1,500 and a hydroxyl group amount of 3 to 8 mmol/g.

6. The low-temperature curable composition according to claim 1, wherein the residue "A" of the lactone-modified polyol (III) represents a residue of an acrylic polyol.

7. The low-temperature curable composition according to claim 6, wherein the lactone-modified polyol has a number average molecular weight of 2,000 to 20,000 and a hydroxyl group amount of 0.5 to 3.5 mmol/g.

8. The low-temperature curable composition according to claim 1 comprising the acyl carbamate group-containing acrylic polymer (a) and the lactone-modified polyol (b) in an amount that a mol ratio of acyl carbamate group to hydroxyl group is 0.5 to 2.0.

9. A paint comprising the low-temperature curable composition according to claim 1 as film-forming component, and an organic solvent.

* * * * *